United States Patent [19]

Cronce et al.

[11] Patent Number: 5,794,826
[45] Date of Patent: Aug. 18, 1998

[54] SPLIT STANCHION ARTICLE CARRIER

[75] Inventors: Gary M. Cronce, Port Huron; Craig A. Stapleton, Troy; Craig R. Prasatek, Rochester Hills, all of Mich.

[73] Assignee: Advanced Accessory Systems LLC, Sterling Heights, Mich.

[21] Appl. No.: 520,960

[22] Filed: Aug. 30, 1995

Related U.S. Application Data

[63] Continuation of Ser. No. 187,391, Jan. 26, 1994, abandoned.

[51] Int. Cl.⁶ ..................................................... B60R 9/04
[52] U.S. Cl. ............................ 224/321; 224/309; 224/326; 224/315; 116/282; 116/200
[58] Field of Search ................................ 224/309, 315, 224/322, 321, 325, 326, 329, 330, 331; 116/282, 200

[56] References Cited

U.S. PATENT DOCUMENTS

| | | | |
|---|---|---|---|
| 3,837,547 | 9/1974 | Joos | 224/331 |
| 4,162,755 | 7/1979 | Bott . | |
| 4,270,681 | 6/1981 | Ingram . | |
| 4,274,570 | 6/1981 | Bott . | |
| 4,323,182 | 4/1982 | Bott . | |
| 4,401,247 | 8/1983 | Zoor | 224/331 |
| 4,487,348 | 12/1984 | Mareydt . | |
| 4,848,112 | 7/1989 | Graber et al. | 224/315 |
| 5,004,139 | 4/1991 | Storm et al. | 224/326 |
| 5,014,893 | 5/1991 | Morley et al. . | |
| 5,320,264 | 6/1994 | Weir | 224/321 |

FOREIGN PATENT DOCUMENTS

| | | | |
|---|---|---|---|
| 4108058C1 | 9/1992 | Germany . | |
| 100778 | 8/1962 | Norway | 224/331 |

Primary Examiner—Linda J. Sholl
Attorney, Agent, or Firm—Rader, Fishman & Grauer PLLC

[57] ABSTRACT

An article carrier for mounting to a vehicle body panel is formed by a crossbar connecting longitudinal rails. The crossbar is made of a cross rail and stanchions which support the cross rail for displacement along and locking engagement with the longitudinal rails. The split stanchions are formed of first and second jaw members, and one of the jaw members is carried by a shelf on the other jaw member and displaced along the shelf by a retainer. The retainer is manipulated by an actuator, preferably in the form of a rotary knob which is selectively engageable with a nut. The nut is threadably engaged on a threaded shaft that is engaged in an insert in the one of jaw parts and extending through the other jaw part. At least one of the jaw parts includes an engagement surface for locking the stanchion to the rail when the retainer has moved the jaws to the closed position. Conversely, the retainer separates engagement surfaces from the longitudinal rail when the jaw parts are moved to an open position, in which the cross rail is displaceable along or removable from the longitudinal rail.

1 Claim, 4 Drawing Sheets

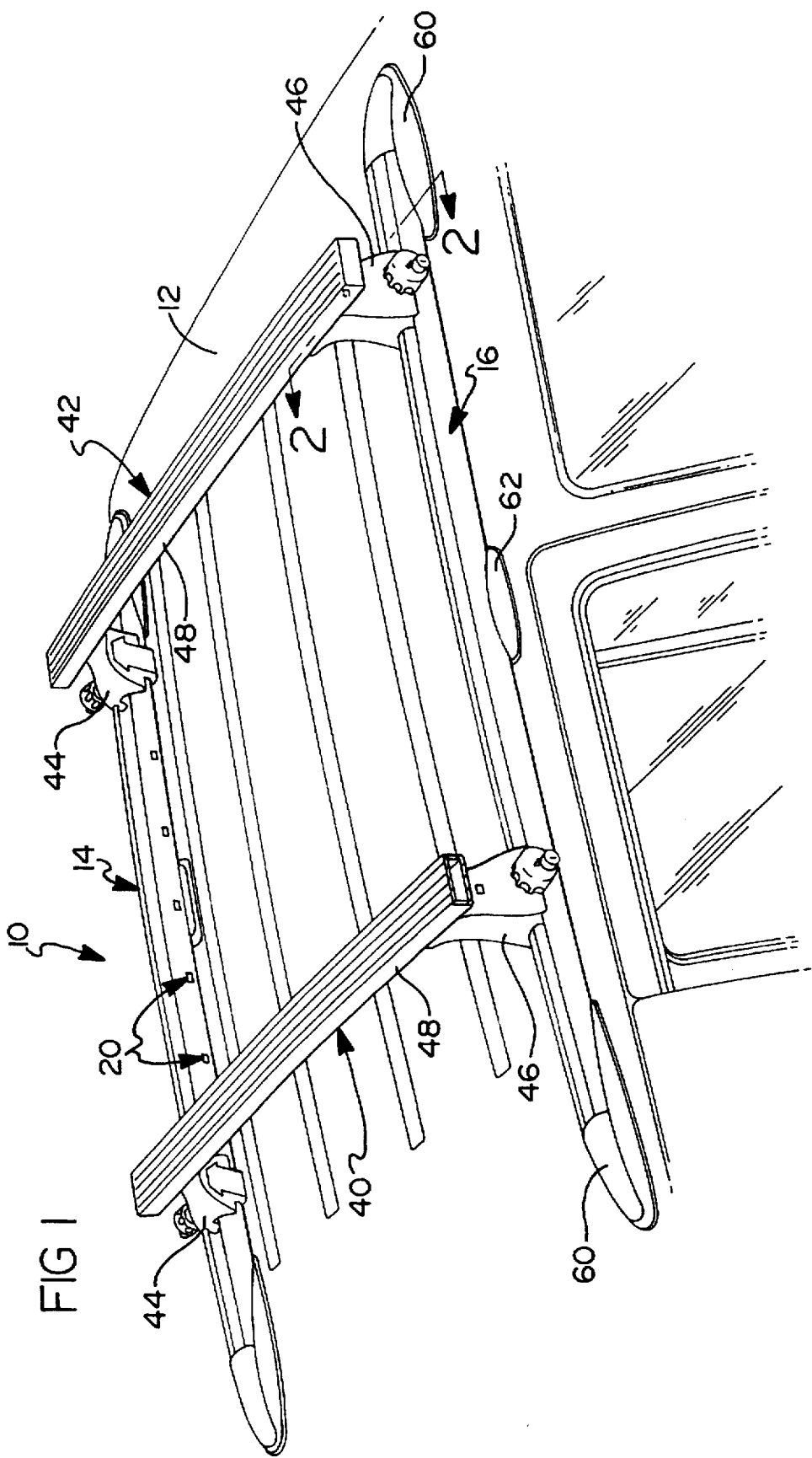

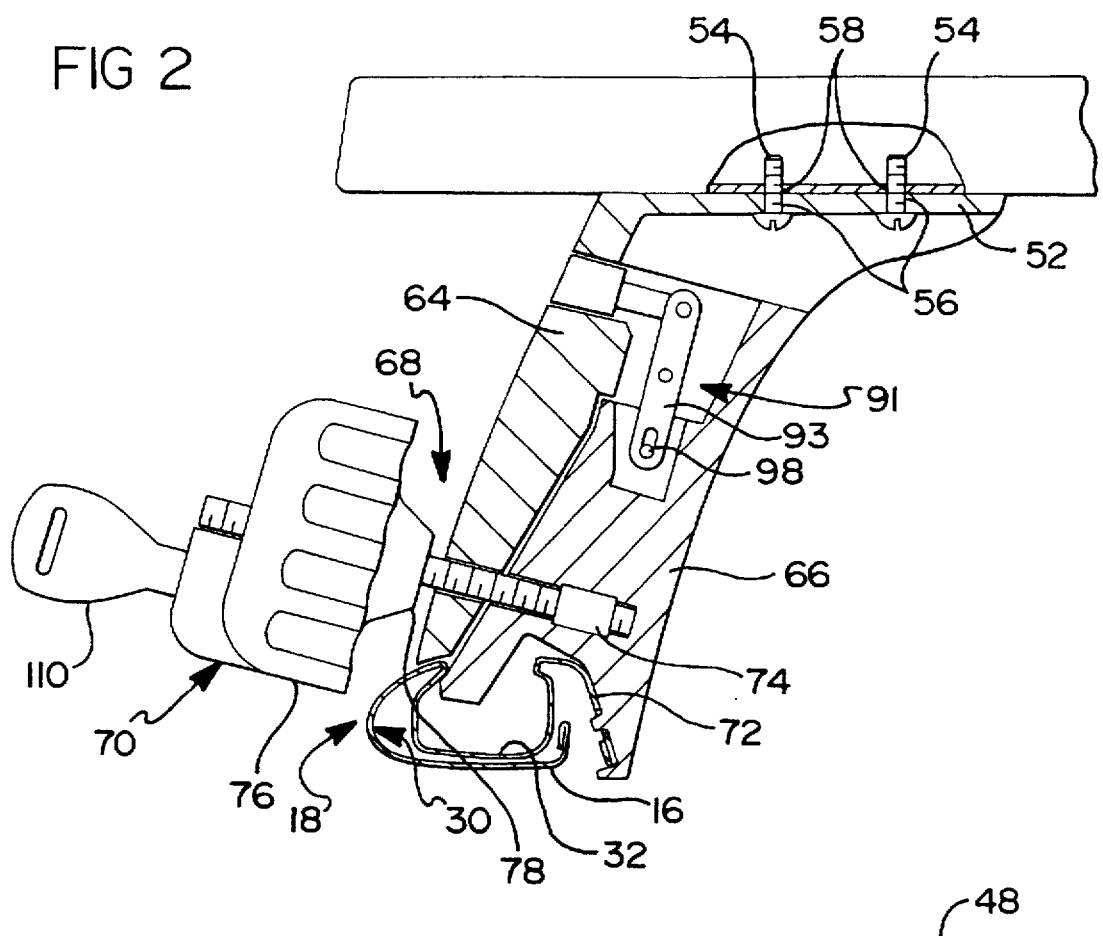
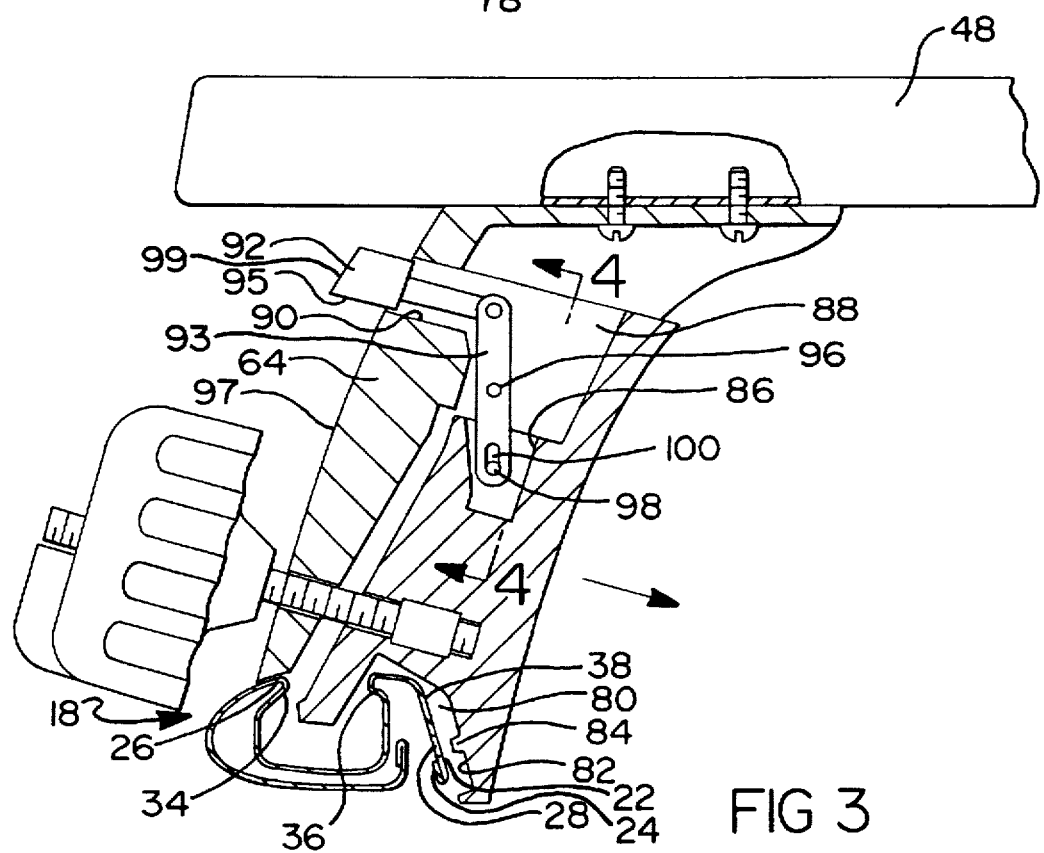

SPLIT STANCHION ARTICLE CARRIER

This is a continuation of application(s) Ser. No. 08/187,391 filed on Jan. 26, 1994 now abandoned.

FIELD OF THE PRESENT INVENTION

The present invention relates generally to vehicle luggage carriers and, more particularly, to a movable crossbar detachably secured to a pair of spaced longitudinal rails.

BACKGROUND ART

There are many previously known vehicle mounted luggage and article carriers. Such article carriers commonly include a pair of spaced apart roof rails affixed to a body panel of the automobile such as the roof top or rear deck panels of the vehicle. At least one, and usually two, crossbars extend transversely across the longitudinal rails. The crossbars may be directly secured to or carried by the longitudinal rails.

In addition, it has also been known to raise the crossbars above the top of the rails by stanchions that support the crossbar in an elevated position. However, crossbars which are permanently secured to the longitudinal rails do not permit the carrier to be adjusted for differing load configurations and article carrying capacities.

Although some crossbars and stanchions are designed for detachable mounting to the longitudinal rails, some of the detachable mounting mechanisms are complicated or difficult to operate. For example, one previously known form of stanchion is disclosed in U.S. Pat. No. 4,270,681, which discloses an article carrier with a slidable bracket. The rails include an open topped channel having a reduced access opening. The bracket includes a base section slidably movable in the channel that retains the bracket within the channel of the rail. The bracket and a cross rail mounted to the bracket may be removed from the track only if the bracket is slid all the way to the open end at the farthest extent of the longitudinal rail. Moreover, the bracket can be locked in position along the longitudinal rail by a key which is threadably secured to a rotatable disk. As the disk is rotated, the key is urged into engagement with the base of a track to urge the base section of the bracket up against the top wall of the restricted channel opening in the longitudinal rail. Such a structure stresses the material forming the reduced opening for the channel in the longitudinal rail.

Another known type of stanchion structure for locking the crossbar in a fixed position along a longitudinal rail is shown in U.S. Pat. Nos. 4,162,755, 4,274,570 and 4,323,182. These patents disclose a stanchion element carried on top of a channeled longitudinal rail. The stanchion receives a through bolt carried by a locking plate that is entrained within the rail channel. The bolt extends through the stanchion member for engagement with a rotatable wheel for tightening the bolt and pressing the top wall of the rail including the restricted channel opening between the plate and the stanchion element. However, like the previously discussed stanchion attachment, the threaded bolt must be disengaged and removed from one of the threaded apertures in the wheel or the lower plate so that the parts may be separated for removal of the stanchion from the longitudinal rail. Alternatively, with the clamping device loosened, the stanchion and crossbar must be slid completely to one longitudinal end of the longitudinal rail to remove the stanchion and crossbar from the rack in the absence of complete disassembly of the bolt retaining mechanism.

Another known luggage carrier construction is shown U.S. Pat. No. 4,487,348 discloses an end bracket for attaching a cross rail to a side rail of a luggage carrier. The bracket includes a first element and a second element pivotally connected to the first element. The first element also includes a threaded insert adapted to receive a bolt carried by the second element and having an enlarged head for manual rotation of the threaded stem. A protruding portion of the rail is inserted between the first and second elements which are then pressed against the protrusion by the rotary locking member. However, the enlarged head is confined beneath the stanchion and cross rail and inside of the side rail in a confined area that is difficult to reach and maneuver the threaded knot stem. Moreover, the two elements are made of substantially different materials and can have substantially different responses to environmental conditions and weather changes. In addition, the side rails must be specially constructed to include a protrusion or a shape which can be wholly confined within jaws shaped to receive the entire cross section of the rails taught in the embodiments disclosed in the patent.

SUMMARY OF THE INVENTION

The present invention overcomes the above-mentioned disadvantages by providing a crossbar with a stanchion that is split to form a first jaw connected to a cross rail, a second jaw displaceably carried by a shelf on the first jaw, and a retainer for detachably clamping the stanchion against the rail by an engagement surface. In general, this shelf permits the pressing surfaces of the jaws to be separated without disassembling all or part of the stanchion. Moreover, the retainer clamps the jaws in response to manual tightening of the clamp, preferably by rotating a handle exposed for easy access from the stanchion.

Another particularly advantageous feature of the present invention is that the stanchion may be removed from the longitudinal or side rail when the jaws are unclamped. In addition, the unclamped condition of the stanchion is identified by an indicator exposed exteriorly of the stanchion. In the preferred embodiment, the indicator comprises a button that protrudes outwardly from a cavity in the stanchion, and the protruding surface is provided with visible indicia such as an orange color to provide a warning to the operator that the jaws are still separated and the crossbar stanchion is not secured. Preferably, mating cavities are formed in the first and second jaws to house a lever mechanism for displacing the button outwardly as the second jaw is moved to separate from the first jaw carrying the cross rail.

In the preferred embodiment, an engagement surface on one of the jaws engages a rail portion when the jaws are in their clamped or closed position. In one embodiment, an engagement surface on one jaw part is received within an upper channel opening of the longitudinal rail while the pressing surface on the other jaw presses against the opposite side of the wall defining the channel. In yet another embodiment, the longitudinal rail includes a side opening and an engagement surface on one of the jaw parts extends into a detent such as an opening in the side wall of the longitudinal rail. In addition, the preferred embodiment shows an improved clamping arrangement in which a flange extends beneath the longitudinal rail when the jaws are in the clamped or closed position.

As a result, the present invention provides a crossbar structure in which the stanchion can be detachably secured to a longitudinal rail without disassembly of the clamp or parts of the stanchion. Moreover, one of the jaw parts is carried by the other jaw part so as to retain corresponding positions and limited directional movement when the jaws have been moved to or released or open position.

The present invention includes a stanchion structure defined by a first jaw and a second jaw carried by the first jaw on a shelf and, a retainer for displacing the jaws against the longitudinal rail for contact by an engaging surface. The engaging surface may be smaller than the entire periphery of the side rail. The present invention also provides a crossbar structure in which an indicator designates the open or unclamped position of the jaws by the readily perceived indicator. In addition, while the pressing surfaces of the jaws can be configured to conform with a wide variety of longitudinal rail contours, the rail is readily removed from a support position along the longitudinal rail without displacement toward an end of the rail. Moreover, the present invention provides a stanchion that can be manually clamped with ease by an operator without complicated alignment or special tools required to actuate the retainer that clamps the jaws against the longitudinal rail Other features and advantages of the present invention will be apparent from the following detailed description taken in connection with the accompanying drawings.

BRIEF DESCRIPTION OF THE DRAWINGS

The present invention will be more clearly understood by reference to the following detailed description of a preferred embodiment when read in conjunction with the accompanying drawing in which like reference characters refer to like parts throughout the views and in which:

FIG. 1 is a top perspective view of the article carrier of the present invention;

FIG. 2 is a side, partially cross-sectioned view of a split stanchion of the present invention shown in the secured position;

FIG. 3 is a side, partially cross-sectioned view of a stanchion of the present invention shown in the disengaged position;

Figure 4:
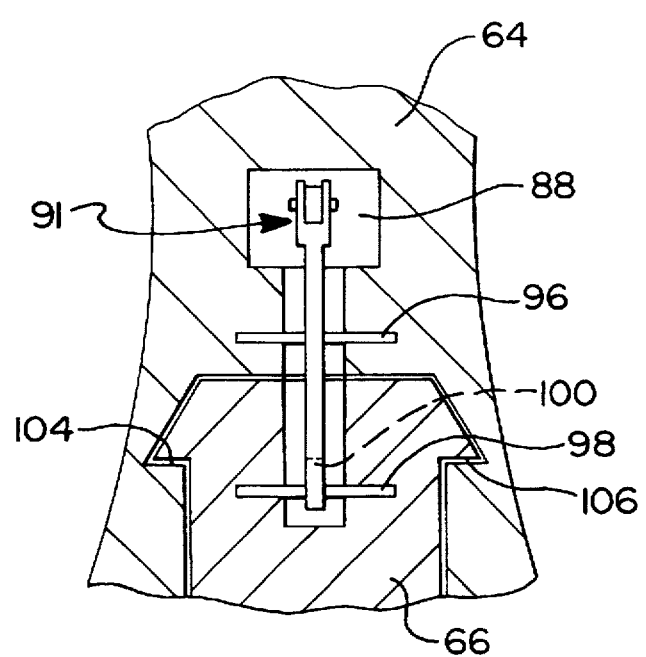
FIG. 4 is a cross-sectional view taken along lines 4—4 of FIG. 3 of the indicator linkage of the present invention.

While only examples of the present invention has been disclosed, it should be understood that other forms of Applicant's invention may be had, all coming within the spirit of the invention and scope of the appended claims.

DETAILED DESCRIPTION OF THE PREFERRED EMBODIMENT

Illustrated in FIGS. 1–3 is an article carrier 10 of the present invention. The article carrier 10 is shown affixed atop an automobile roof top 12. The article carrier 10 also includes a pair of parallel roof rails 14 and 16. Preferably, each roof rail 14 and 16 generally includes a track 18 extending along the rails 14 and 16. Although each rail is shown including a channel 30, the track 18 may be formed by only a part or all of the rail walls forming the channel 30. Generally, each roof rail 14 and 16 includes a side wall 24 including a plurality of spaced apart detents 20, each detent preferably comprising an opening 22 in the rail wall 24 and preferably being positioned in longitudinal registration with a detent 20 on the opposite rail.

In the embodiment shown in FIGS. 1 through 3, the track 18 of each of the roof rails 14 and 16 further includes a first track segment 26 and a second track segment 28. As shown in FIGS. 2 and 3, the first track segment 26 is preferably defined by a wall portion defining the arcuate channel 30. The channel 30 includes an enclosed cavity portion 32 beneath opposing upper lip portions 34 and 36. The rails 14 and 16 are formed in the preferred embodiment of a roll formed sheet of material such as aluminum or steel but they could also be formed of an extruded material, for example aluminum. The rails mounted by end caps 60 and center foot 62 to raise the rails above the roof panel 12.

Still referring to FIGS. 2 and 3, second track segment 28 extends from lip portion 36 along wall 24. In the preferred embodiment of the present invention, detents 20 are disposed within the second track segment 28. It is preferred that each detent comprise an opening 22 defined within elongate wall segment 38.

A pair of crossbars 40 and 42 are shown extending from roof rail 14 to roof rail 16. In the embodiment shown in FIG. 1, each crossbar 40 and 42 generally comprises a pair of split stanchions 44 and 46 which are generally right and left hand versions of a similar structure, shown in more detail in FIGS. 2 and 3 with reference to stanchion 46, and a cross rail 48. In the preferred embodiment, the cross rail 48 is manufactured from a steel tube, having a generally rectangular cross section, although other materials can also be used depending on load support limitations.

The cross rail 48 is bolted or otherwise connected to and extends from split stanchion 44 to split stanchion 46. Each split stanchion preferably includes a connecting section 52 which is adapted to be fastened to cross rail 48 by a pair of common screw fasteners 54. The screw fasteners are received within registering bores 56 and 58 within the connecting section 52 and the cross rail 48 respectively. Preferably, the connecting member 52 is formed as part of one of the jaws 64 and 66 described below.

As shown in FIG. 2, a split stanchion structure 44 or 46 according to the present invention is typically illustrated by the details disclosed in the sectional of view stanchion 46. The stanchion comprises a first jaw 64 and a second jaw 66 made of metal or plastic such as Dupont Zytel ST801. The jaws are displaceably connected together by a retainer 68 comprising a threaded shaft 72 and an actuator 70. The shaft 72 is carried in an insert 74 mounted in the jaw 66. A nut is threadably engaged on the bolt 72 to actuate engagement of the jaws 64 and 66 to the closed position shown in FIG. 2. The nut is tightened by an actuator 70 comprising an enlarged rotary knob 76 that carries the nut at 78.

As the rotary knob is turned to tighten the nut 78 against the jaw 64, the jaws 64 and 66 tighten or close engagement surfaces against mating portions of the rail. In particular, engagement surfaces on the jaws may engage portions of the track 18 formed on the longitudinal rail 16. The jaw 66 includes a cavity 80 (FIG. 3) that receives a side wall of the rail 16.

The cavity 80 is defined by a wall portion 82 adapted to mate with track portion 28 and including projections 84 adapted to be received in the openings 22.

In addition, as also shown in FIGS. 2 and 3, the first track segment 26 is detachably engaged between engagement surfaces of the jaw 64 and the jaw 66. In particular, the lip 34 may be entrapped between engagement surfaces of the jaws 64 and 66 at the same time the engagement surface 82 engages the track portion 28.

The other end of the jaw 66 includes a cavity 86 registering with a cavity 88 in the jaw 64. The cavity 88 continues from a bore 90 exposed exteriorly of the jaw 64 and positioned to expose a button 92 carried in the bore 90. Button 92 includes a stem pivotally secured to a lever. The lever 93 in turn is pivotally secured by a pin 96 mounted in the jaw 64 across cavity 88. Another pin 98 is mounted in the jaw 66 to extend across the opening 86. The pin 98 is carried in an elongated slot 100 in the end of the lever 93 so that movement of the jaw 66, limited to the direction of the arrow shown in FIG. 3 as discussed below, will move the pin so that the lever pivots about the pivot pin 96 to expose the button 92 exteriorly of the stanchion 46. The outside surface 95 may be colored with a bright color, while the end surface 99 of button 92 remains matched with the color of the surface 97.

As best shown in FIG. 4, the indicator 91 (FIG. 2) is loaded in an expanded cavity 88. Moreover, the jaw 64 provides a shelf 104 receiving an expanded or T-shaped head surface 106 on the jaw part 66 to form a shelf which maintains the integrity of the split stanchion 46 during displacement of the jaws 64 and 66 and which limits the direction of movement to provide directional control over the displacement between the jaws.

It will be noted that the pin 98 is shown in an upper portion of the slot 100 when the jaws are in their closed position shown in FIG. 2. Conversely, when the jaws are displaced apart as shown in FIG. 3, the pin 98 is displaced toward the bottom of the slot 100 as the lever 93 is pivoted about the pin 96 to expose the button 92.

The actuator 70 may be lockably retained upon the shaft 72 in a well known manner, for example a lock retainer made available by King Roof Industrial Co. Ltd. which is operable by a key 110. Rotation of the key in one direction permits the handle 76 to be freely rotated about the nut 78 without displacing the nut 78 in threaded engagement along the shaft 72. Conversely, a further turn of the key locks the handle for rotation with the nut so that rotation of the handle moves the nut along the threaded shaft.

Figure 5:
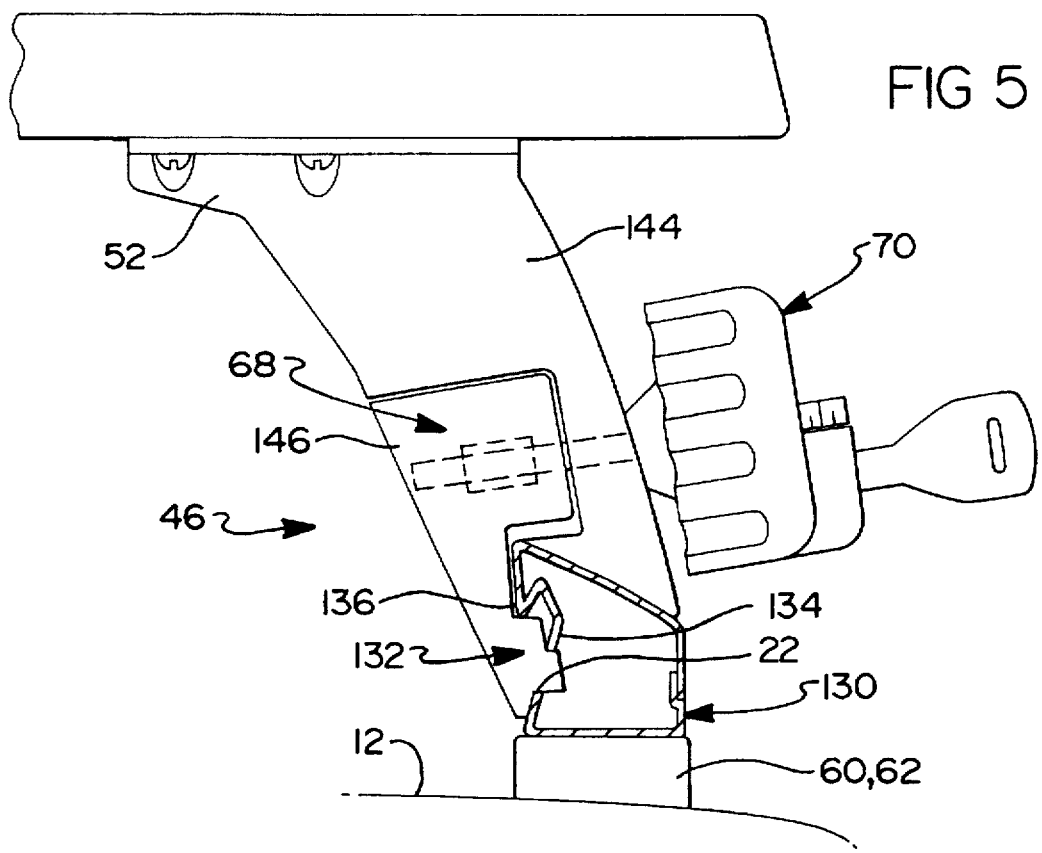
FIG. 5 is a side, partially cross-sectioned view of an alternative embodiment of a split stanchion of the present invention showing the stanchion in the engaged position.
Figure 6:
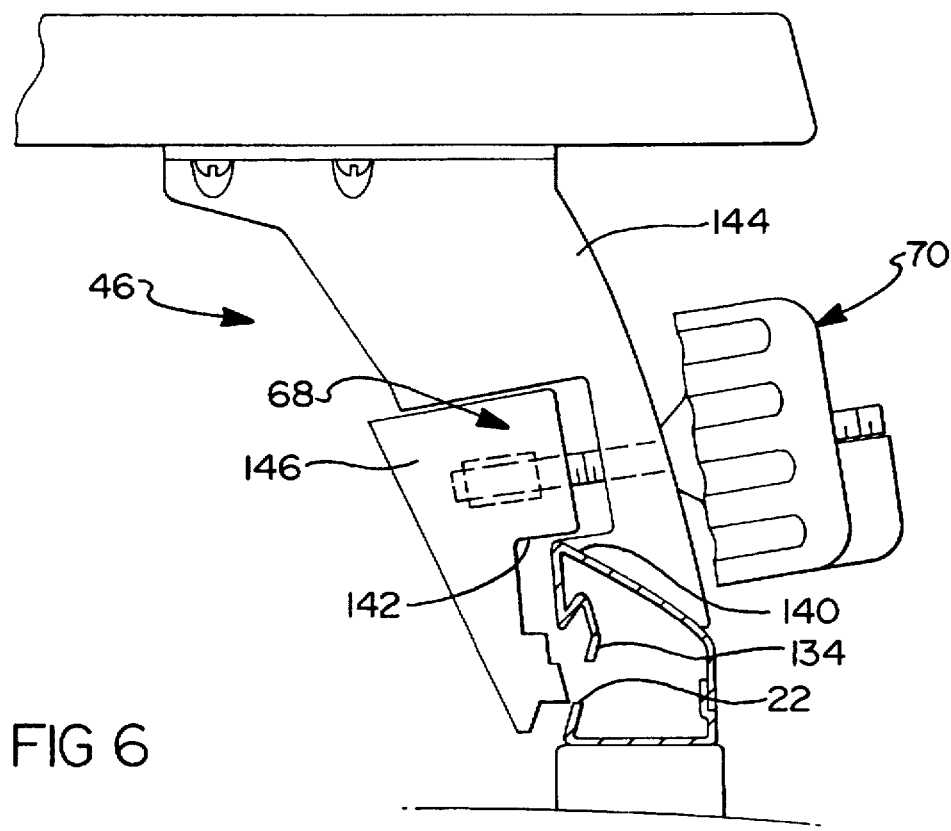
FIG. 6 is a side, partially cross-sectioned view of the alternative embodiment of FIG. 5 shown in the disengaged position.

An alternative version of a split stanchion is shown in FIGS. 5 and 6. Unlike the rails 14 and 16 shown in FIG. 1, a longitudinal rail 130 includes a track 132 comprising a recessed wall 134 including the openings 22 and an abutment corner 136. Corner 136 is pressed between engagement surfaces on the jaw member 144 and jaw member 146. The split stanchion 46 is provided with a connecting portion 52 in much the same way as the version shown in FIGS. 2 and 3. Similarly, the jaws 144, 146 are displaced by a retainer 68 as previously discussed and operated by an actuator 70 as shown and described in regard to FIGS. 1–4. Moreover, the embodiment shown in FIGS. 5 and 6 does not show the indicator 91 although it is to be understood that the indicator arrangement is equally applicable to this version of split stanchion as well as other stanchion constructions according to the present invention.

As best shown in FIG. 6, a surface 140 extending in a direction of displacement for the jaws may be used to form a shelf whereby one of the jaw parts carries the other jaw. While the jaw 144 is shown including the shelf surface 140 to receive the mating surface 142 of the jaw 146, either jaw part may be formed with a connecting portion 52 as described in this disclosure or another mounting means for securing the stanchion to the cross rail.

Having thus described the present invention, many modifications thereto will become apparent to those skilled in the art to which it pertains without departing from the scope and spirit of the invention as defined in the appended claims.

What is claimed is:

1. A cross bar for a vehicle panel mounted article carrier with longitudinal rails comprising:

a cross rail;

first and second stanchions for supporting said cross rail on the longitudinal rails;

at least one of said first and second stanchions comprising a first jaw secured to said cross bar;

a second jaw, carried by a shelf in said first jaw, at least one of said jaws including an engagement surface for mating with a rail portion;

a retainer for displacing said jaws along said shelf between a closed position at which said first jaw and said second jaw enclose at least a mating portion of one of the longitudinal rails with said engagement surface for attachment to said one longitudinal rail, and an open position separating said first jaw from said second jaw and said engagement surface from said mating rail portion;

an indicator for exposing indicia exteriorly of said at least one stanchion when said retainer secures said jaws in said open position wherein said indicator comprises a button slidably carried in an exposed bore in one of said jaws; and wherein said button engages a first lever end, said lever is pivoted at a point intermediate said first end and a second end, and said second end is displaced by engagement with the other of said jaws.

* * * * *